United States Patent
Csendes

(10) Patent No.: US 6,360,975 B1
(45) Date of Patent: Mar. 26, 2002

(54) METHOD AN APPARATUS FOR COMMINUTING SOLID PARTICLES

(76) Inventor: Ernest Csendes, 865 Via de la Paz, Suite A-8, Pacific Palisades, CA (US) 90272-3618

( * ) Notice: Subject to any disclaimer, the term of this patent is extended or adjusted under 35 U.S.C. 154(b) by 0 days.

(21) Appl. No.: 09/524,836

(22) Filed: Mar. 14, 2000

Related U.S. Application Data

(63) Continuation-in-part of application No. 09/339,476, filed on Jun. 24, 1999, now abandoned.

(51) Int. Cl.⁷ .............................................. B62C 23/32
(52) U.S. Cl. ........................... 241/19; 241/56; 241/79.1
(58) Field of Search ................................ 241/19, 24.31, 241/48, 52, 56, 79.1, 79.3, 78, 154, 161, 162

(56) References Cited

U.S. PATENT DOCUMENTS

| | | | |
|---|---|---|---|
| 293,047 A | * | 2/1884 | Jackey |
| 911,913 A | * | 2/1909 | Snyder |
| 1,524,651 A | * | 2/1925 | Hapgood |
| 2,752,097 A | * | 6/1956 | Lecher |
| 3,690,571 A | * | 9/1972 | Luthi |
| 5,280,857 A | * | 1/1994 | Reichner |
| 5,695,130 A | | 12/1997 | Csendes |
| 5,826,807 A | * | 10/1998 | Csendes |
| 5,850,977 A | * | 12/1998 | Csendes |
| 5,947,599 A | | 9/1999 | Funk |
| 6,179,231 B1 | * | 1/2001 | Csendes ................ 241/19 |

* cited by examiner

*Primary Examiner*—Daniel C. Crane
(74) *Attorney, Agent, or Firm*—Edward A. Sokolski

(57) ABSTRACT

A single cylindrical chamber has a drive shaft rotatably mounted therein and extending along substantially the entire length thereof. This drive shaft is rotatably driven by a motor at a speed of 2000–5000 rpm, this speed being chosen so that the natural resonant frequency of the various components of the system is at least three times this rotation speed. Solid dry coarse particles to be comminuted which may be of coal, limestone/dolomite, cement or lime are fed into the chamber. Pressurized air is fed into the bottom of the chamber which in conjunction with a stationary velocity head provides uplifting pressure for driving the air and particles upwardly in the chamber. The upwardly driven particles are first driven through a plurality of rotors which are driven by the shaft and provide a centrifugal force which forms them into a vertical toroidal fluid bed that allows increased tonnage production and comminutes the particles. The particles are then driven through a plurality of semipermeable screens which are rotatably driven by the shaft and generate vertical vortexes and horizontal cyclones, thereby further comminuting the particles and providing for internal classification. The final product consisting of comminuted and classified particles is expelled from the top end of the chamber.

16 Claims, 9 Drawing Sheets

HORIZONTAL CIRCULAR FLUID BED

UNIT OF TWO ADJACENT PERMEABLE MEANS (SPM)
GENERATION OF VERTICAL VORTEXES AND HORIZONTAL CYCLONES

PARTICLE SIZE DISTRIBUTION CURVES FOR PORT SAMPLES AT 6-INCH INSERTION

METHOD AN APPARATUS FOR COMMINUTING SOLID PARTICLES

This application is a continuation in part of my application Ser. No. 09/339,476 filed Jun. 24, 1999, now abandoned.

BACKGROUND OF THE INVENTION

1. Field of the Invention

This invention relates to a method and apparatus for comminuting solid particles and more particularly to such a method and apparatus which utilizes pressurized gas and a stationary velocity head to drive the particles upwardly in a chamber through rotors and semipermeable screens which forms a vertical fluid bed, vortices, and cyclones which effect both the comminuting and classifying action.

2. Description of the Related Art

Micronized limestone is used in agriculture, industrial fillers, environmental controls and the construction trade. Micronized cement is useful in the building industry.

Micronized coal is used as an energy source in the generation of electricity and micronized limestone/dolomite or lime are used for environmental compliance in the flue gas cleanup of power plants. Micronized coal burns with a flame velocity similar to natural gas or fuel oil and with a short flame that allows the heat energy generated in the combustion to be readily transferred to the water walls of the boiler. This results in an increased boiler rating and less heat losses through the ducts and flue stack. In addition to providing a more complete combustion, the micronized coal upon combustion yields a micronized fly ash with low carbon content which is of considerable value in the construction industry as a substitute for cement in high strength concrete formulations.

In addition the combustion of micronized coal requires no excess air and results in minimized NOx in the flue gases. When used in conjunction with Low-Nox burners, the micronized coal allows a better control of the NOx emissions in the main combustion zone of the boiler and reduces substantially the unburned carbon carry-over with the fly ash. Micronized limestone, dolomite or hydrated lime are most valuable in the dry hot scrubbing of flue gases and affords a more effective aqueous scrubbing thereof as these particles have much larger reactive surfaces for the SOx and NOx scrubbing. This results in a more complete utilization of the sorbents resulting in substantial savings in the flue gas clean up section of a power plant in conforming to the requirements of the Clean Air Act.

The use of micronized coal and limestone/dolomite or lime as the fuel for generating electric power thus has significant advantages over the use of conventional fuels such as fuel oil or non-micronized coal and is much less expensive than natural gas.

In my U.S. Pat. No. 5,695,130 issued Dec. 9, 1997, a grinding system is described in which rotating screens with wide mesh openings are first used to comminute particulate material through spiral vortexes and such comminuted material is then fed to circular vortexes formed between rotating discs and stationary plates where the final grinding of the particulate material is accomplished and the final comminuted material is separated from the gas streams by centrifugal fans. The system and method of the present invention applies the basic technology of my prior patent in implementing the micronization of solid particles such as coal, limestone/dolomite, lime, and cement clinker. The system of the present invention, however, provides an improvement over the system of my prior patent by providing means to increase the production capacity of the micronizer through the use of a toroidal fluid bed generated with an outside pressurized gas and by minimizing the stress and erosion of the rotating elements and the vibration of the shafts and rotors employed thus lowering the system power requirements and lessening wear on the system. Further the device of the present invention employs a cascade of semipermeable screens without the need of a centrifugal expelling fan downstream from each such semi-permeable screen as in the device of my prior patent. The device of the present invention, besides having vertical spiral vortexes generated by the rotating semi-permeable screens and accommodating the micronizing of the high speed particles, generates horizontal cyclones in the space above the rotating semipermeable screens which achieves a centrifugal sorting of the comminuted particles whereby larger particles are recycled for further comminution. Thus, a final end product results without the need for using an outside classifier. In the device of the present invention, the use of a cascade of rotating semi-permeable screens provides for a graduated grinding of the ascending particles. This allows for control of the particle size and surface area in the final end product by varying the number of rotating semi-permeable screens in the vertical stack of such screens which forms the cascade.

SUMMARY OF THE INVENTION

The device and method of the present invention achieves the above indicated improvements by 1. utilizing a single chamber in which the shaft which drives all of the rotating elements is supported on a single pair of low friction bearings located at the top and bottom of the chamber; further, rather than employing a drive fan at the bottom of the chamber for driving the particles upwardly, a stationary velocity head is employed in conjunction with a pressurized air source to drive the particles upwardly along the walls of the chamber; 2. the rotation velocity for the rotating system components( rotors, and screens) is chosen such that the natural resonant frequencies of the system components are at least three times greater than this rotation velocity; 3. the rotors are designed so that they do not impact on the particles but rather generate kinetic energy in the form of centrifugal vortices in the air stream.

In the system of the invention, pressurized air is fed into the bottom of a chamber into which dry coarse particles to be comminuted are fed. Uplift action is provided by means of a stationary velocity head in the form of an inverted semi-ellipsoidal tank in conjunction with the pressurized air. The particles are first comminuted by a series of rotors designed to generate centrifugal vortices in the uplifting air which effect the comminuting action. The particles are then passed through a series of semi-permeable rotating screens which further effect the comminuting action. The fully comminuted particles are then driven out of the chamber to collecting chambers by means of fans or the gas stream.

A single chamber is employed to achieve the grinding action and all of the rotating elements in this chamber are mounted on and driven by a single shaft which rotates at a velocity of 2000–5000 rpm. The stress created in the rotating elements by the high centrifugal forces and the vibration of these elements and that of the shaft are overcome by design factors which are pointed out below.

It is therefore an object of this invention to provide a system and method for comminuting particles which consumes less power and results in less wear on the rotating and fixed elements employed.

It is a further object of this invention to provide a system and method which can be readily scaled up in production capacity and to enable the creation of a controllable particle size and surface area by varying the number of semipermeable screens in a cascade thereof.

It is still a further object of this invention to provide a system and method for comminuting particles in which vibration of the system components is minimized.

Other objects of the invention will become apparent in view of the following description taken in connection with the accompanying drawings.

DETAILED DESCRIPTION OF THE INVENTION

Referring now to the FIGS, a preferred embodiment of the invention is illustrated.

Figure 1:
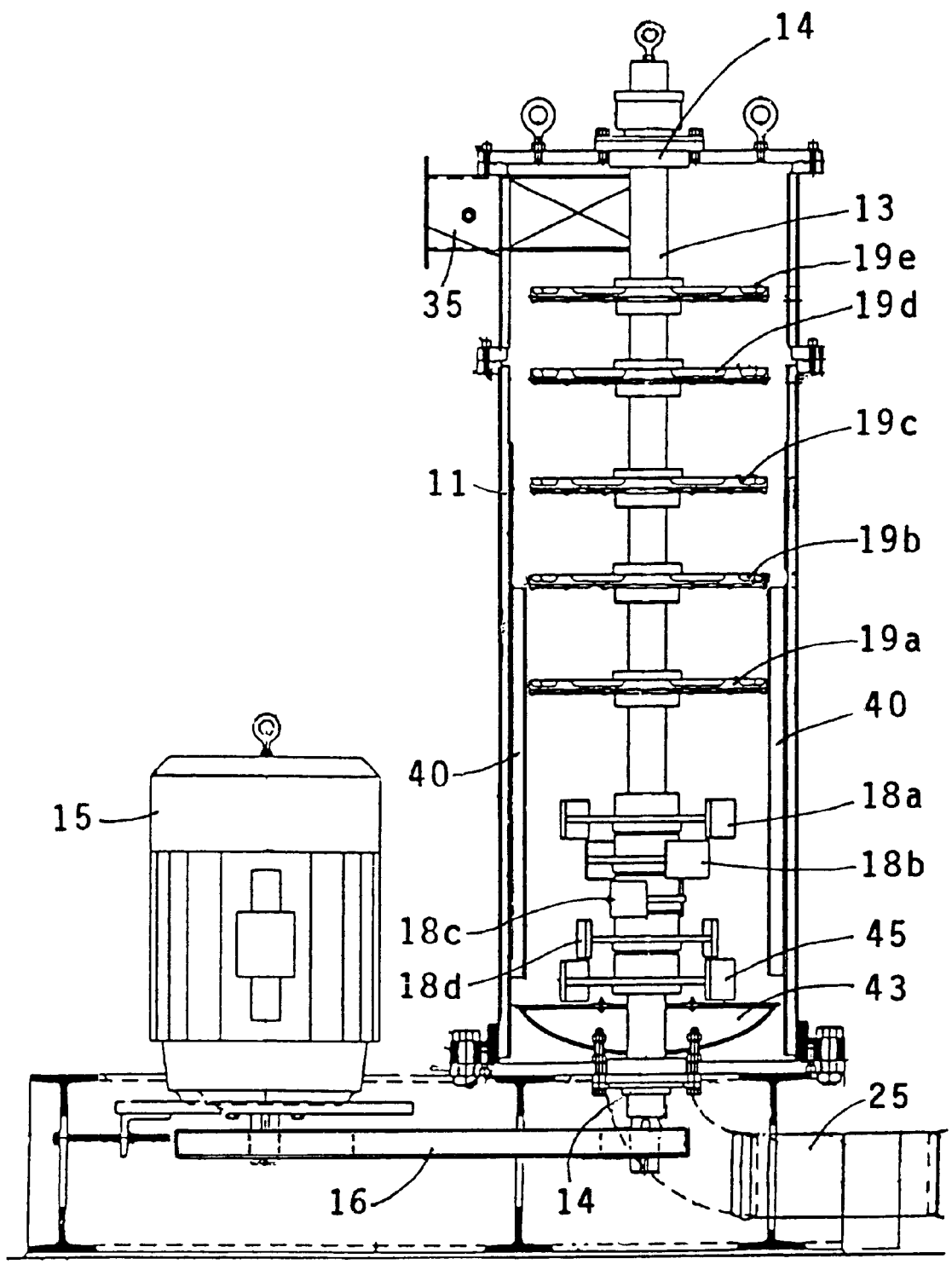
FIG. 1 is a side elevational view illustrating a preferred embodiment of the invention.
Figure 2:
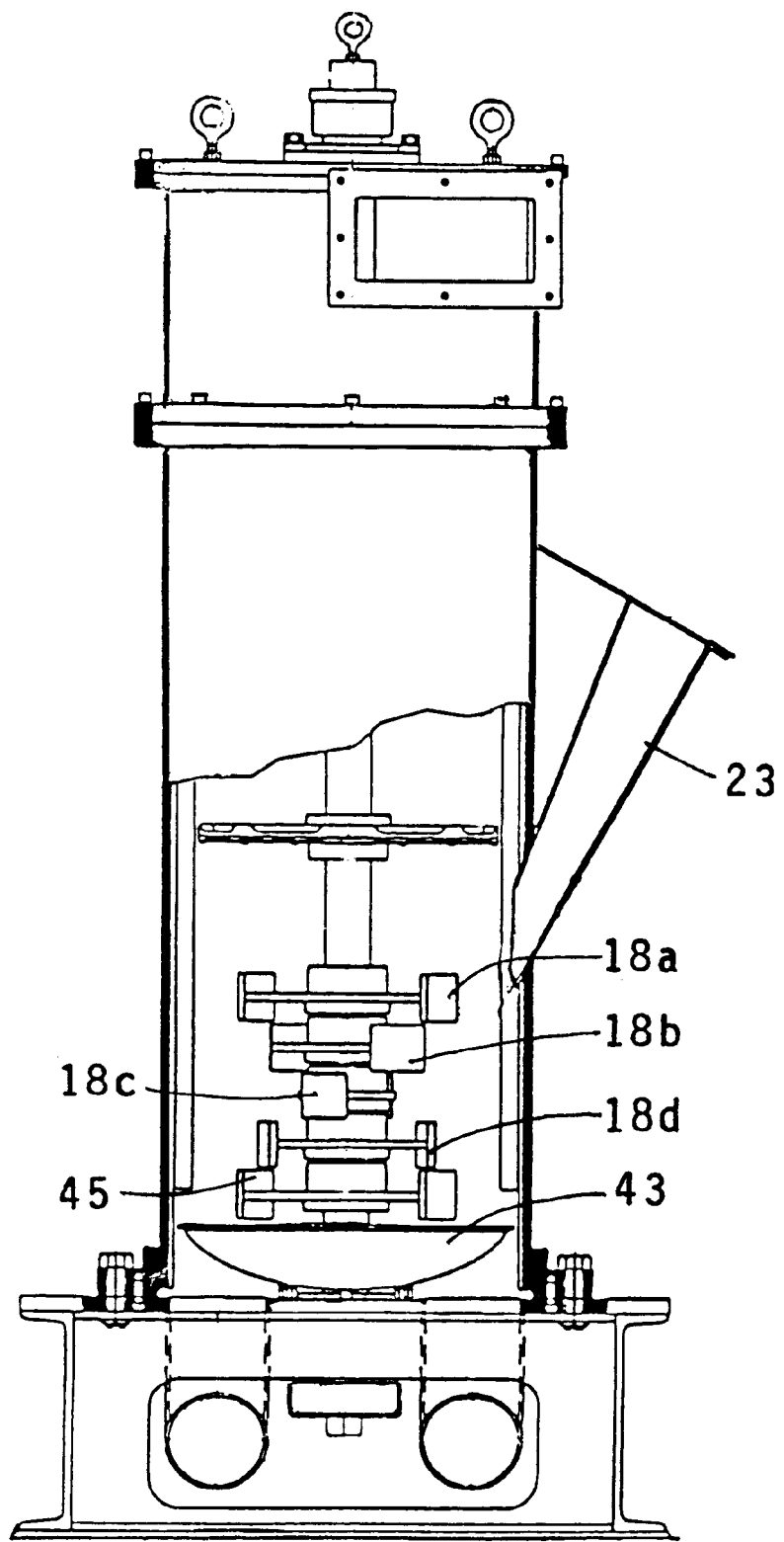
FIG. 2 is an end elevational view with partial cutaway of the preferred embodiment.
Figure 3:
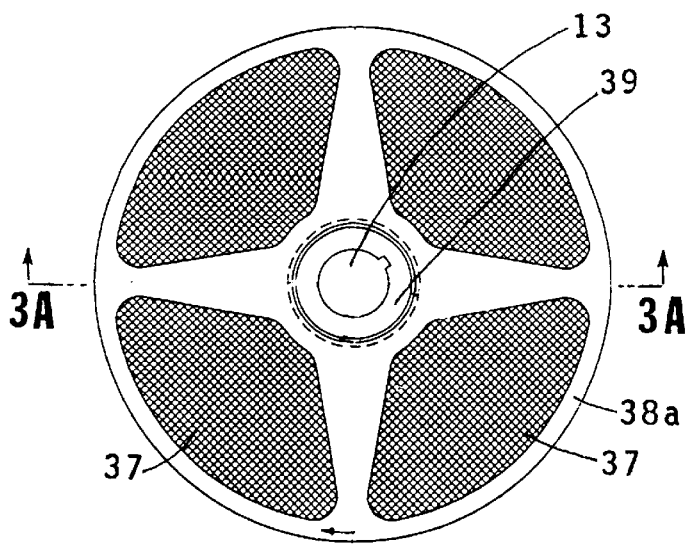
FIG. 3 is top plan view of one of the semipermeable screens of the preferred embodiment.
Figure 3A:
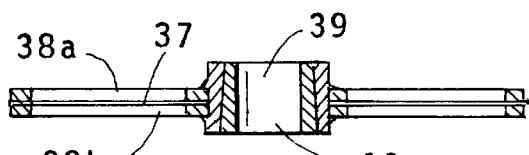
FIG. 3A is a cross sectional view taken along the plane indicated by 3A—3A in FIG. 3.
Figure 4:
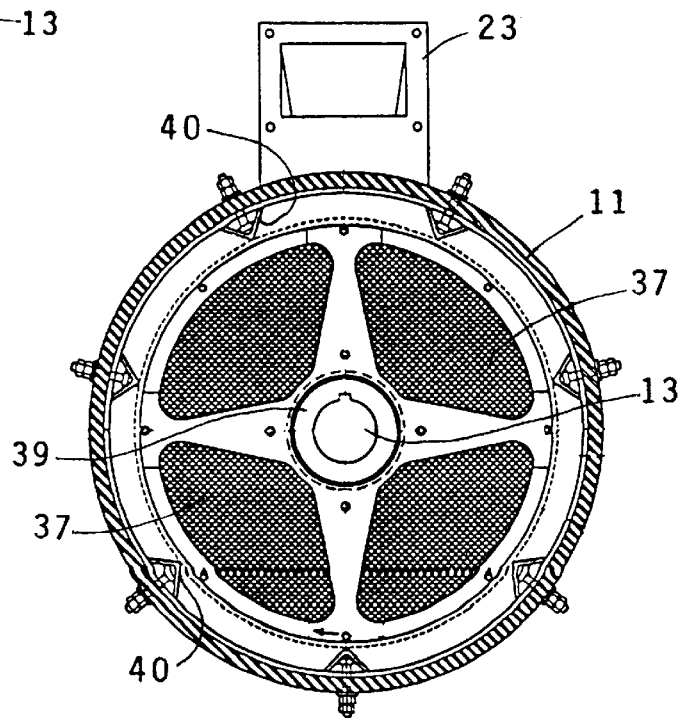
FIG. 4 is a top plan view of one of the semipermeable screens of the preferred embodiment shown installed in the chamber.

Referring to FIGS. 1 and 2, chamber 11 which is cylindrical is maintained in an air tight condition. The walls 12 of the chamber are lined with a material such as rubber or neoprene. Drive shaft 13 is mounted for rotation within the chamber solely at the top and bottom ends on low friction bearings 14 and is rotatably driven by motor 15 through belt drive 16 preferably at a speed of 2000–5000 rpm. This speed is preferably set so that the resonant frequency of any of the components of the system is at least three times this speed.

Connected to shaft 13 for rotation therewith are rotors 18a–18c and semipermeable screens 19a–19c.

Solid particles which may be of coal, cement clinkers or limestone on the order of ¼" in diameter which may have a surface moisture content of 2–10% are fed from a feed hopper(not shown) by means of a screw feeder (not shown) into feed channel 23.

Figure 5:
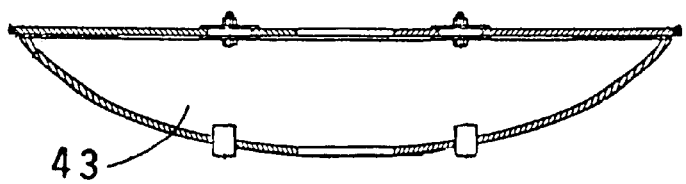
FIG. 5 is a side cross sectional view of the stationary velocity head of the system of the invention.
Figure 6:
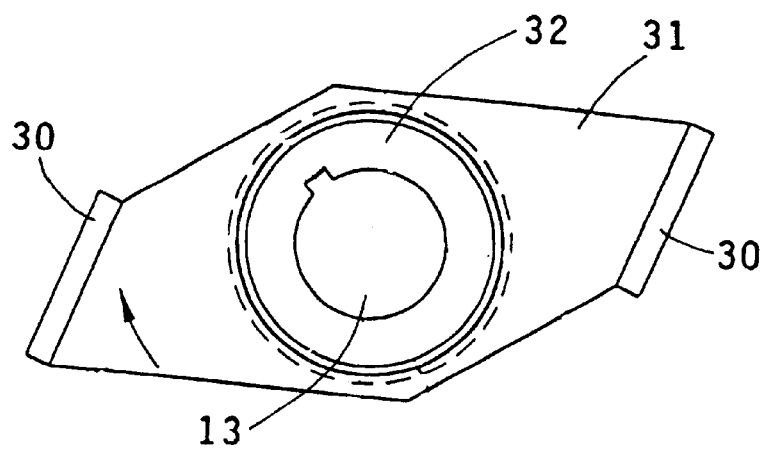
FIG. 6 is a top plan view of one of the rotors utilized in the system of the invention.
Figure 7:
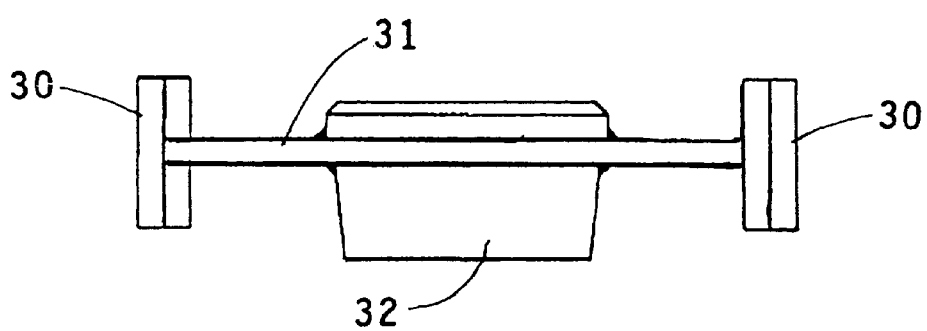
FIG. 7 is a side elevational view of the rotor of FIG 6.
Figure 8:
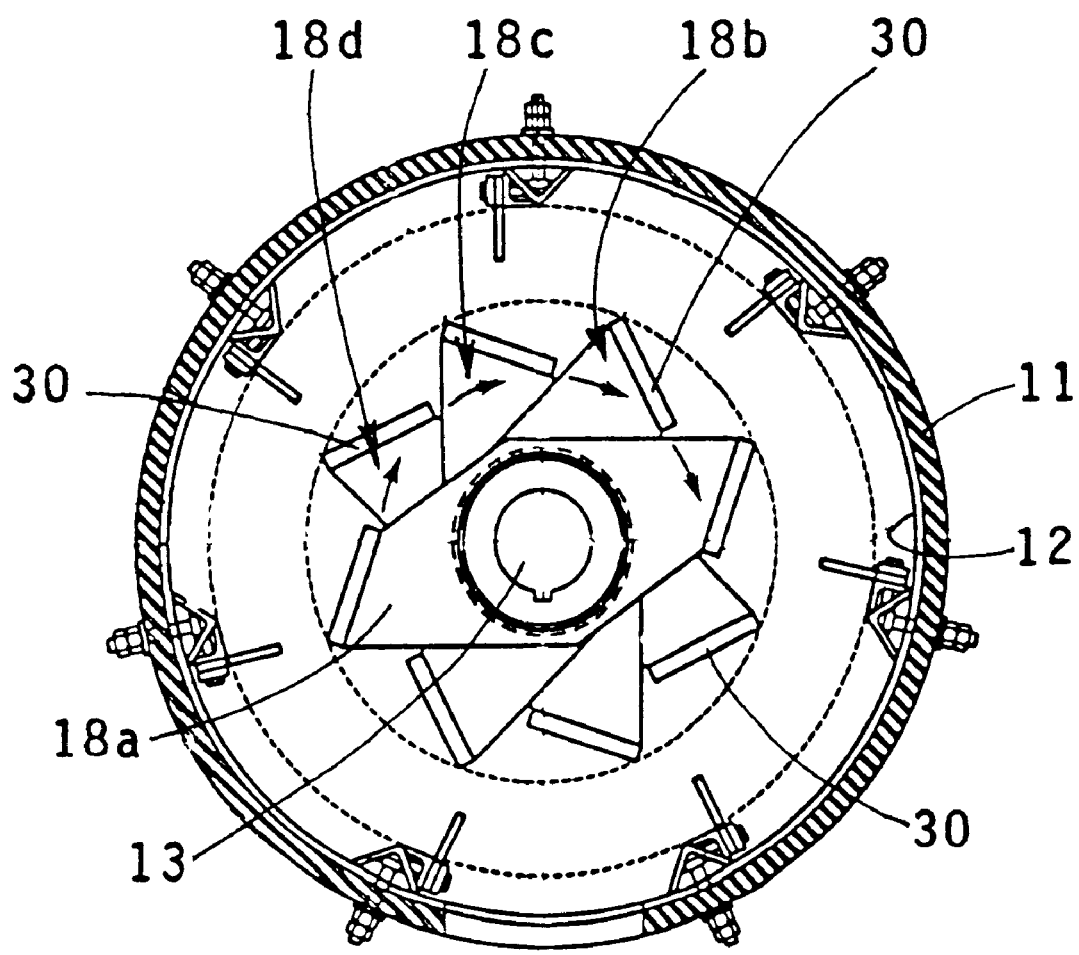
FIG. 8 is a top plan view illustrating one of the rotor assemblies installed in the chamber.
Figure 9:
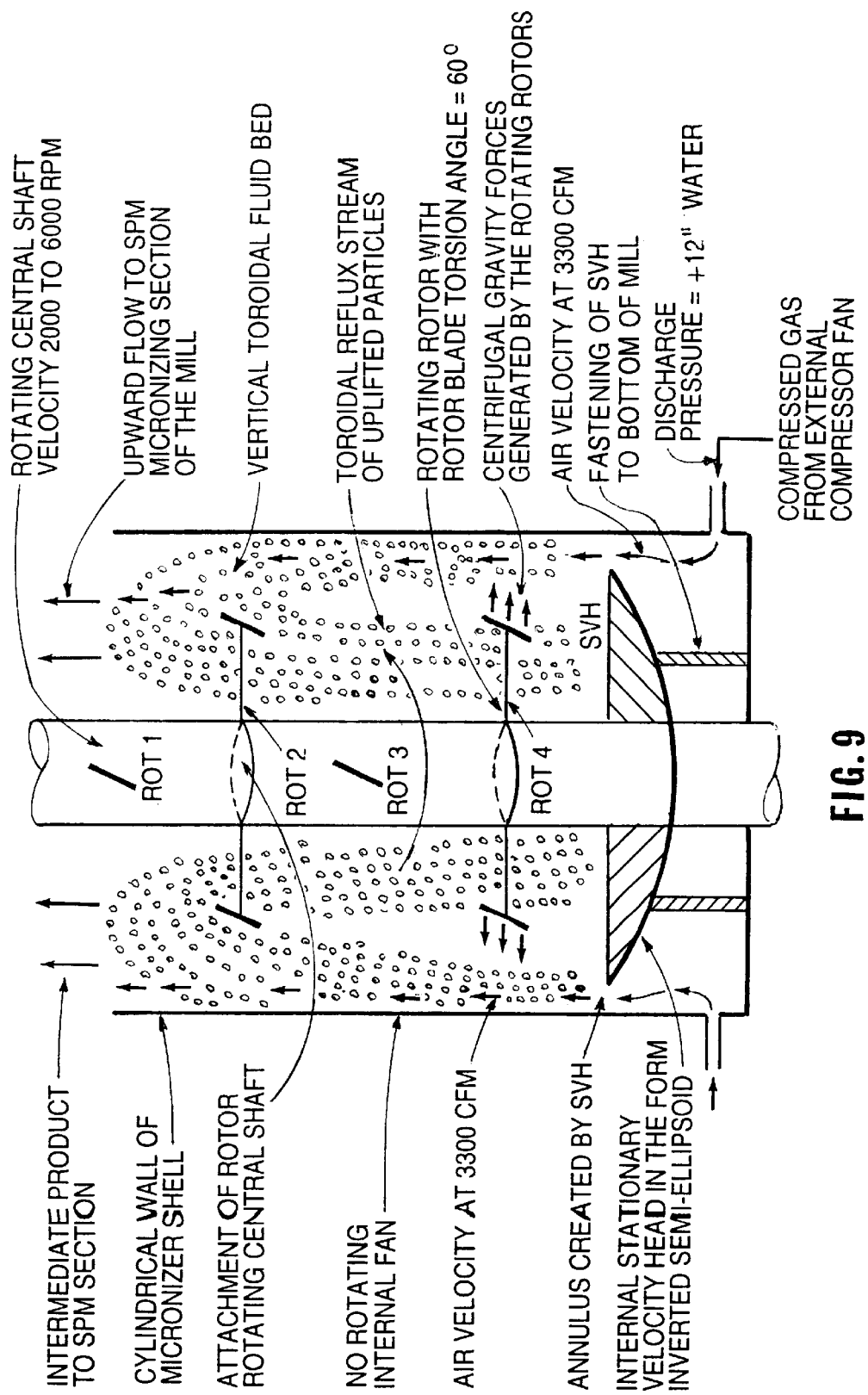
FIG. 9 is a diagrammatic view showing the vertical toroidal fluid bed generated in the device of the invention.
Figure 10:
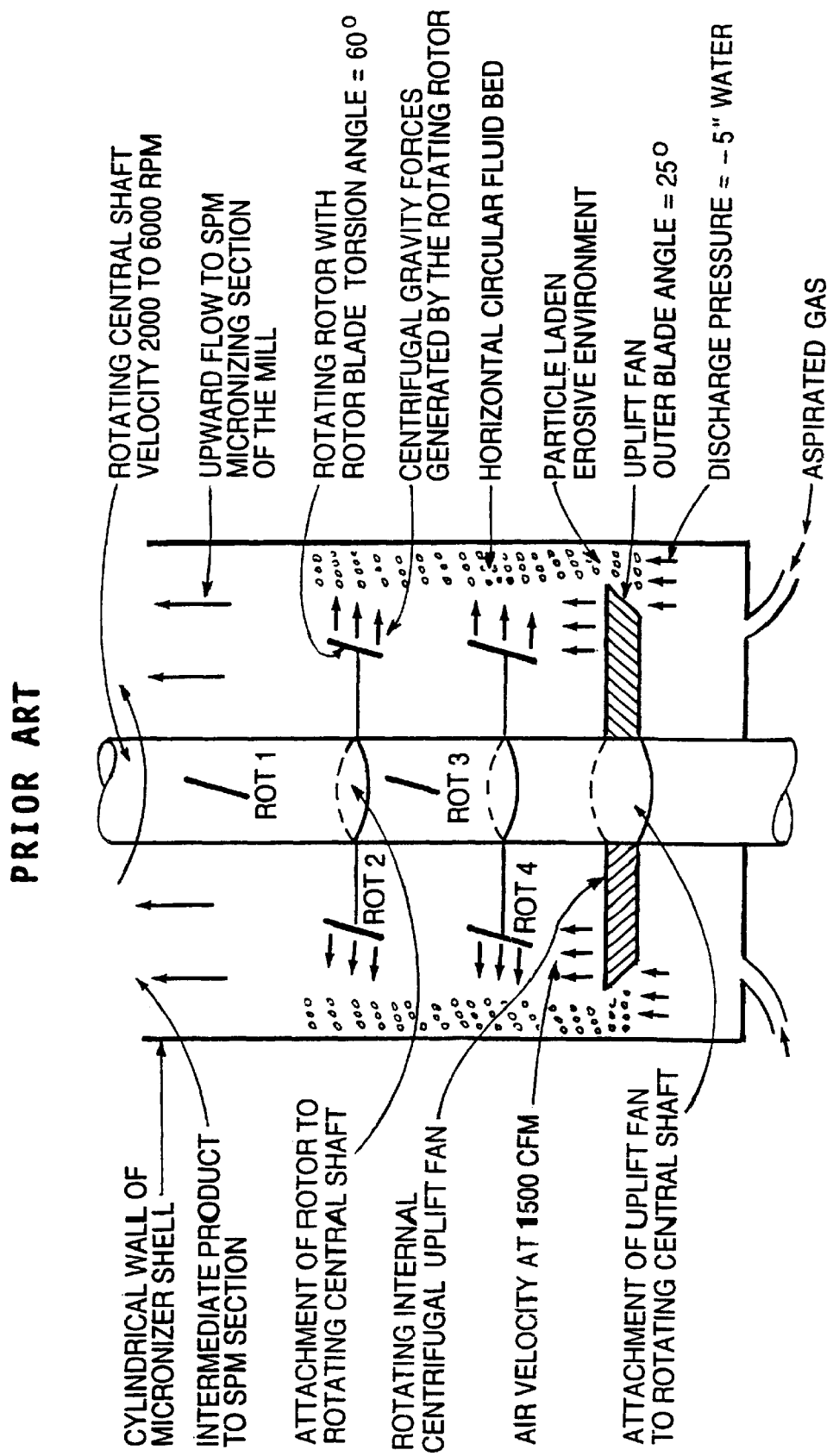
FIG. 10 is a diagrammatic view illustrating the horizontal circular fluid bed formed in a prior art device.
Figure 11:
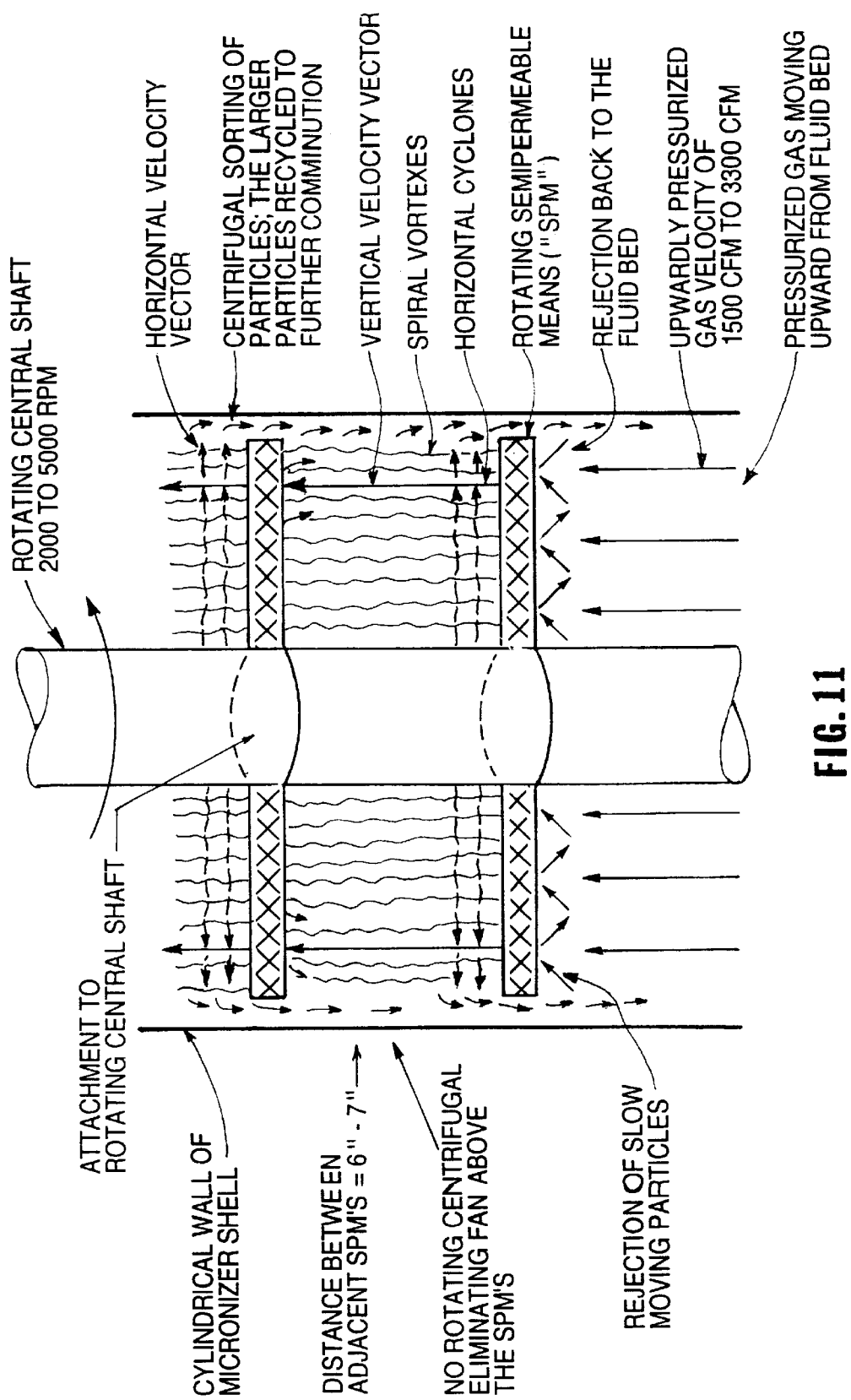
FIG. 11 is diagrammatic view illustrating the generation of vertical vortices and horizontal cyclones in the device of the invention.

Pressurized gas(preferably air) is fed through inlet tubing 25 into the bottom of the chamber. Stationary velocity head 43 which is in the shape of an inverted semi-ellipsoidal tank, as can best be seen in FIG. 5, is mounted on the bottom of the chamber 11. The pressurized flow of air into inlet 25 is distributed by velocity head 43 in the form of an annulus providing a uniform air curtain directed upwardly along the inner wall of the chamber. The vertical toroidal bed generated by the dual action of the compressor fan and the stationary velocity head is illustrated in FIG. 9. By using an outside generated pressurized gas (air) flow, the variation of the gas pressure inside the micronizer becomes independent of the rotational velocity of the rotating shaft, as opposed to the operation of the prior art illustrated in FIG. 10 where the pressure inside the micronizer is generated by an internal uplift fan, such pressure being dependent upon and limited by the prevailing velocity of the rotating shaft. By increasing the internal gas pressure in the toroidal fluid bed of the device of FIG. 9 (and thereby also increasing the gas velocity in the micronizer), the production capacity of the micronizer is increased without affecting the particle size distribution in the end product. The residence time of the particles in the chamber is also decreased by such pressure increases in the toroidal fluid bed. Further, by eliminating the need for internal rotating fans in the device of the present invention the erosion and wear on the micronizer is minimized.

Rotors 18*a*–18*e* which are shown in detail in FIGS. 6–8, are connected to shaft 13 by means of shaft attachments 32. The rotor blades 30 are angled with respect to the longitudinal axis of rotor arms 31 by an angle of about sixty degrees. The design of the rotors is such that they do not impact on the particles in the fluid bed but rather transmit the kinetic energy which they generate into the air stream between the rotor blades and the inner wall of the chamber which performs the comminuting action by virtue of the centrifugal forces generated in this air stream. This is illustrated in FIG. 10. As the particles decrease in size, the effect of the centrifugal force decreases, and the flow dynamics carries the reduced size particles towards the rotating semi permeable screens 19*a*–19*e*.

The slower moving larger particles are repulsed by the screens and driven back down for regrinding. The particles are again driven upwardly by rotor 45 in conjunction with the air pressure. The smaller particles which pass through the screens are exposed to the vertical spiral air vortexes and horizontal cyclones created by the rotating screens 19*a*–19*e*. The screens are preferably mounted vertically at 6"–7" apart. The action of the screens is illustrated in FIG. 11. The cascaded semi permeable screens effectively micronize and classify the particles which exit from the top of the chamber through exit duct 35. This exiting is effected by means of a product collecting cyclone(not shown) to which duct 35 is connected and the final comminuted end product is isolated without further need of an external classifier.

The structure of the semi permeable screens is illustrated in FIGS. 3, 3A and 4. Wire screens 37 which are preferably about 4 mesh are sandwiched between holder frames 38*a* and 38*b*, these holder frames being coupled to drive shaft 13 by means of shaft attachment 39. FIG. 4 shows one of the screens installed in the chamber 11. Vertical flow enhancers 40 (also shown in FIG. 1) are installed in the walls of the chamber to enhance the flow of fluid.

In summary, the pressurized flow of air into the inlet 25 at the bottom of the chamber 11 is distributed by velocity head 43 in the form of an annulus providing a uniform air curtain directed upwardly along the inner wall of the chamber 11. Based on Stokes law, to adequately suspend ¼" feed particles, a vertical velocity of 75 ft./sec is required. This is accomplished by employing an annulus thickness for head 43 in the range of ¼" to ⅜." The gas velocity needed will vary with the specific density of the feed; e.g. limestone between 3000–3600 cfm; coal between 1700–2800 cfm. The fan used to generate the compressed air stream(not shown) has a variable frequency drive, permitting operation over a range of discharge pressures and air flow rates. A recirculating bottom rotor 45 is provided to recirculate particles which may fall to the bottom of the chamber.

Figure 12:
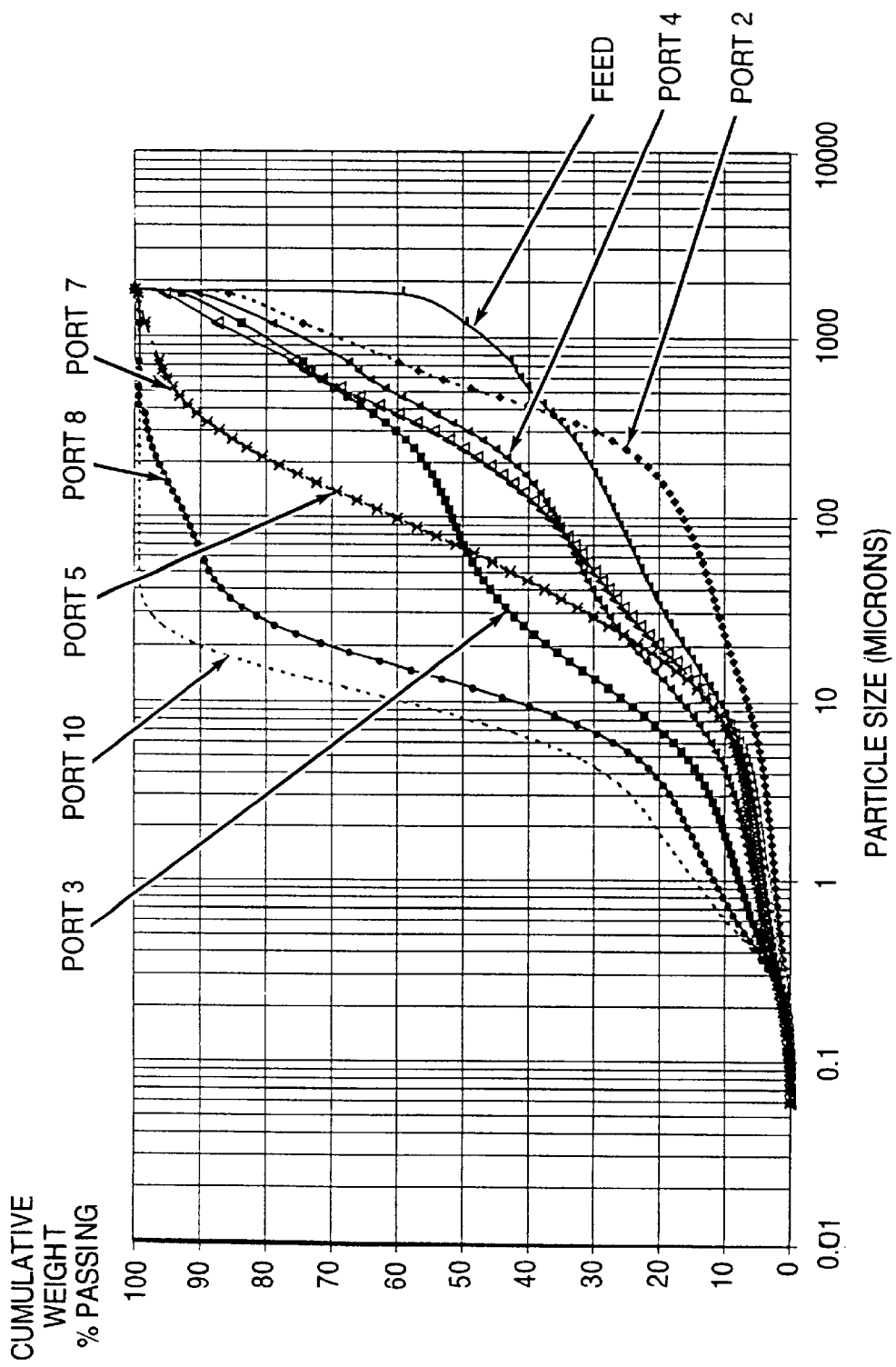
FIG. 12 is a diagrammatic view illustrating the functioning of an operative embodiment of the system of the invention in comminuting particles.

Referring to FIG. 12, the effective operation of operative embodiments of the device of the invention is illustrated.

As pointed out, the use of the stationary velocity head 43 in lieu of an air uplift fan, as employed in the prior art, provides a more efficient air movement. Further, this approach eliminates the need to expose a fan to the turbulent stream of particles with the resultant erosion of the fan blades which requires frequent repair or replacement. FIG. 12 shows how the system of the invention actually achieves the efficient operation asserted in the grinding of limestone. Referring additionally to FIG. 1, the sizes of particles at six inch insertion at various "ports" along the chamber as well as the grain density at these locations is illustrated.

As can be seen, the particles fed in (FEED) have a particle size of 1800 microns; below the rotors (18a–18d) which is "Port 2," the particle size is reduced to 300 microns with a grain density of 16 at 3" depth and 162 at 6" depth; between rotors 18b and 18c (Port 3), the particle size is 200 microns; Above rotor 18a (Port 4), the particle size is 200 microns with a grain density of 132 at 3" depth and 135 at 6" depth; above semi-permeable screen 19a (Port 5) the particle size is 100 microns with a density of 805 at 3" depth and 385 at 6" depth; Between semi-permeable screens 19b and 19c (Port 7), the particle size is 12 microns with a density of 1798 at 3" depth and 178 at a depth of 6"; above semi-permeable screen 19c (Port 8) the particle size is 4 microns with a density of 195 at 3" depth and 253 at 6" depth; above semi-permeable screen 19e (Port 10), the particle size is 3 microns with a density of 178 at 3" depth and 52 at 6" depth.

While the invention has been described and illustrated in detail, it is to be clearly understood that this is intended by way of illustration and example only and not by way of limitation, the scope of the invention being only by the terms of the following claims.

I claim:

1. A system for comminuting solid particles comprising:
    a single chamber;
    means for feeding said solid particles into said chamber;
    an outside source of pressurized gas, gas from said pressurized source being fed into the bottom end of said chamber;
    stationary means mounted in said chamber near the bottom end thereof for providing uplifting pressure for driving said gas and said particles upwardly in an annulus along the inner wall of the chamber facilitating the creation thereby of a toroidal fluid bed of particles;
    at least one rotor having blades rotatably mounted in said chamber, said rotor generating a centrifugal driving force in the gas between the ends of the rotor blade and the inner wall of the chamber which is partitioned by baffles affixed to said wall for comminuting the particles as they are driven upwardly;
    at least two semi permeable screens rotatably mounted in said chamber above said rotor;
    a shaft, said screens and rotor being mounted on said shaft;
    said particles being driven from said rotor against said screens with the smaller particles passing therethrough and the larger particles being driven back to the rotor for further comminution, said screens generating vertical spiral gas vortices which further comminute the particles and horizontal cyclones which centrifugally sort the passing high speed particles and recycle them down for further communition in the upwardly moving gas stream;
    means for expelling the comminuted particles from said chamber; and
    motor means for rotatably driving said shaft.

2. The system of claim 1 and including a plurality of said screens having 4–10 mesh.

3. The device of claim 1 wherein the rotational velocity of the screen and rotor is 1200–10,000 rpm.

4. The device of claim 1 and further including gas flow enhancers installed along the side walls of said chamber.

5. The system of claim 1 wherein said rotor has arms which are oriented horizontally and blades at the ends of the arms which are oriented vertically and angulated with respect to the horizontal axes of said arms at an angle of approximately sixty degrees.

6. The system of claim 1 wherein the resonant frequencies of said rotating rotors and screens are at least three times the rotational velocity of said shaft.

7. The system of claim 1 wherein said means for driving said gas and said particles upwardly includes a stationary velocity head in the shape of a semi-ellipsoid located near the bottom of said chamber, said velocity head distributing the pressurized flow of air entering the chamber in the form of an annulus to provide a uniform air curtain directed upwardly along the inner wall of the chamber.

8. A system for comminuting solid particles comprising:
    a single chamber;
    means for feeding said solid particles to said chamber;
    a outside source of pressurized gas, gas from said pressurized source being fed into the bottom of said chamber;
    a stationary semi-ellipsoidal velocity head for in conjunction with the outside pressurized gas generating an uplift pressure which drives the gas and the particles upwardly in an annulus along the inner wall of the chamber;
    at least one rotor mounted in said chamber, said rotor generating centrifugal driving forces in the gas for comminuting the particles as they are driven upwardly past the ends of the rotor;
    at least two semi-permeable screens mounted in said vessel above said rotor;
    a shaft to which said rotor and screen are attached, low friction bearings supporting said shaft solely on the top and bottom ends thereof;
    said particles being driven from said rotor against said screens with the smaller particles passing therethrough and the larger particles being driven back to the rotor for further comminution, said screens generating vertical spiral gas vortices which further comminute the particles and horizontal cyclones which provide for the classification of the high speed particles passing through the screens and recycle larger particles downwardly for further vertical communition;
    motor means for rotatably driving said rotor, and said screens, the resonant frequencies of the components of said system being at least three times the rotational velocity of the rotating shaft; and means for expelling the comminuted particles from the chamber; and motor means for rotatably driving said shaft.

9. The system of claim 8 and including a plurality of rotors and a plurality of semi-permeable screens.

10. The system of claim 8 wherein said screen has 4–6 mesh.

11. The system of claim 8 and further including gas flow enhancers installed along the inner walls of said chamber.

12. The system of claim 8 wherein said rotor has arms which are oriented horizontally and blades at the ends of the arms which are oriented vertically and angulated at an angle of about sixty degrees relative to the horizontal axis of said arms.

13. A method for comminuting solid particles comprising the steps of:

feeding said particles into a chamber;

feeding compressed gas from the outside into the bottom of said chamber;

generating uplift pressure on said compressed gas to drive said gas and said particles upwardly in said chamber;

passing said particles along the walls of the chamber which are partitioned by baffles affixed thereto, and thereby facilitating the creation of a torioidal fluid bed of particles past the ends of a plurality of rotating rotors which provide centrifugal forces which comminute the particles;

further comminuting the particles by driving them through vertical spiral gas vortices and effecting centrifugal sorting of the particles through horizontal cyclones generated by means of rotating semi-permeable means and thereby recycling the larger particles to lower semipermeable means for further vertical comminution in the upward moving gas stream; and expelling the comminuted particles from said chamber.

14. The method of claim 13 wherein said uplift pressure on said compressed gas is generated by passing the gas past a stationary velocity head having a semi-ellipsoidal shape, said velocity head distributing the flow of gas in the form of an annulus to provide a uniform air curtain directed upwardly along the inner walls of the chamber.

15. The method of claim 13 wherein the rotation velocity of said rotor and screen is chosen so that the resonant frequencies of the components employed are at least three times said rotation velocity.

16. The method of claim 13 wherein the particle size and surface area of the final comminuted product are controlled by varying the number of semi-permeable screens employed in he vertical stack of said screens attached to the rotating shaft and allowing for repeated and continuous recycling of the larger particles by the horizontal cyclones generated in the gas stream.

\* \* \* \* \*